CARL LEMKE.
Improvement in Bread-Cutters.

No. 119,861.            Patented Oct. 10, 1871.

Attest:
Jas. H. Layman.
Walter Allen

Carl Lemke
INVENTOR.
Knight Bros.
attys

UNITED STATES PATENT OFFICE.

CARL LEMKE, OF CINCINNATI, OHIO.

IMPROVEMENT IN BREAD-CUTTERS.

Specification forming part of Letters Patent No. 119,861, dated October 10, 1871.

*To all whom it may concern:*

Be it known that I, CARL LEMKE, of Cincinnati, Hamilton county, Ohio, have invented certain Improvements in Bread-Cutters, of which the following is a specification:

This invention consists in pivoting one end of the knife to a vibrating-arm which is hinged to a standard that projects vertically from the bed-plate of the apparatus, and said knife is provided with a notch into which a latch is capable of being engaged so as to prevent any movement of the cutter whenever the implement is not in use, and is suspended from a nail or other suitable support.

Figure 1:
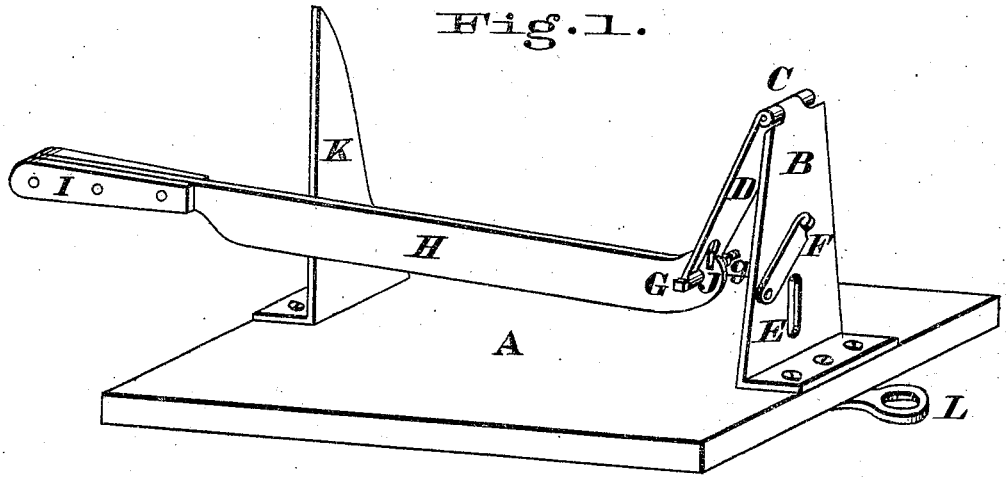
Figure 2:
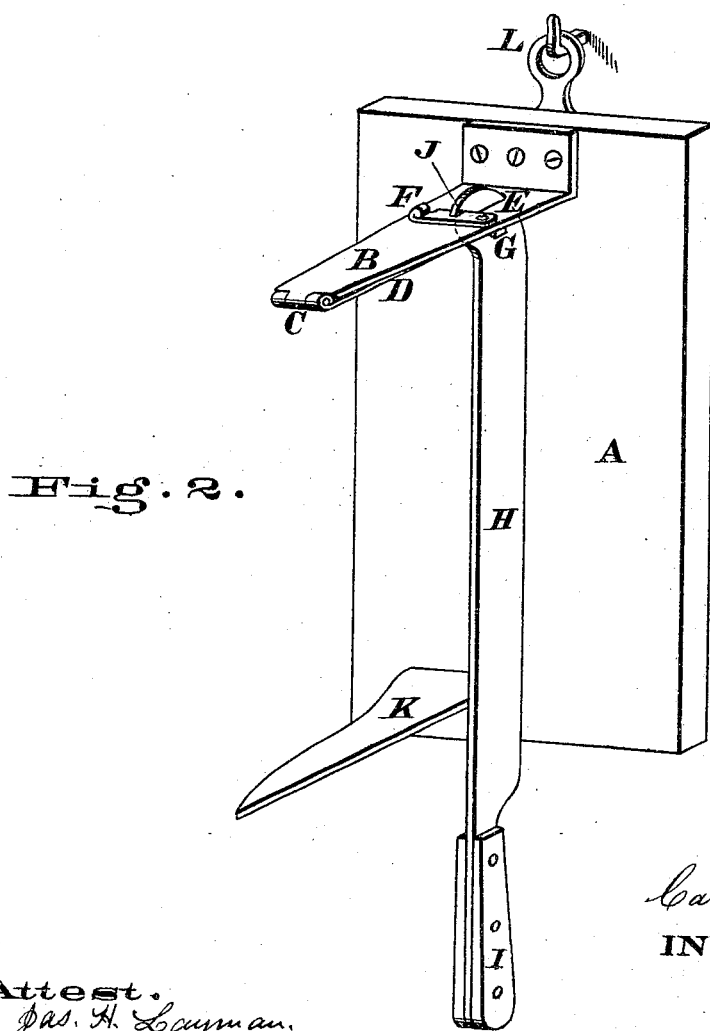

Figure 1 is a perspective view of my improved bread-cutter in condition for use, and Fig. 2 is a perspective view showing the implement in its closed and suspended condition.

A represents the bed-plate or table, having near one of its ends a vertically-projecting standard, B, to whose upper end is hinged at C a vibrating arm, D. This standard is slotted at E and furnished with a latch, F, for a purpose which will be hereafter described. Pivoted to free end of arm D, by bolt G, is a knife, H, having a handle, I, and a notch, J. K is a stop, against which the loaf of bread abuts, and this stop also serves to guide the knife in a proper path. L is an eye or ring, by which the implement can be suspended when not in use.

The cutter is operated in the following manner: The loaf of bread is placed upon the table A, with one of its sides resting against the stop K, and the end of the loaf is allowed to project beyond said stop a distance equal to the desired thickness of slice which is to be cut. The operator then, grasping the handle I, pushes the knife forward and downward in such a manner as to impart a shearing cut to it, thereby severing the loaf at a single stroke and with the least amount of exertion. At the same time the handle I is being thus operated the heel of the knife is drawn downward and forward by the action of lever or arm D.

Whenever it is desired to sharpen the knife, it can be detached from the vibrating arm by simply unscrewing the nut $g$ from the pivot-bolt G.

When the implement is not in use the heel of the knife is passed through the slot E and the latch F is engaged with the notch J, in which condition the cutter can be suspended, as shown in Fig. 2. In this condition the knife is locked and the latch cannot be accidentally disengaged from the notch.

I claim as my invention—

The combination, as herein described, of bed-plate A, slotted standard B E, vibrating arm C D, knife H I J, latch F, and pivot G $g$, for the object stated.

In testimony of which invention I hereunto set my hand.

CARL LEMKE.

Witnesses:
 GEO. H. KNIGHT.
 JAMES H. LAYMAN.          (88)